United States Patent [19]

Akerman

[11] 4,223,635
[45] Sep. 23, 1980

[54] MILKING METHOD AND APPARATUS

[76] Inventor: David E. Akerman, Broad Lane Farm, Seend, Melksham, Wiltshire, England

[21] Appl. No.: 959,618

[22] Filed: Nov. 13, 1978

[30] Foreign Application Priority Data

Nov. 12, 1977 [GB] United Kingdom ............... 47199/77
Jan. 28, 1978 [GB] United Kingdom ................ 3536/78

[51] Int. Cl.³ .......................... A01J 5/04; A01J 7/00
[52] U.S. Cl. .............................. 119/14.02; 119/14.03; 119/14.08; 119/14.47; 119/14.5
[58] Field of Search ............... 119/14.02, 14.01, 14.03, 119/14.08, 14.1, 14.11, 14.47, 14.48, 14.49, 14.5

[56] References Cited

U.S. PATENT DOCUMENTS

| | | | |
|---|---|---|---|
| 3,246,631 | 4/1966 | Holm | 119/14.03 |
| 3,603,292 | 9/1971 | Finch | 119/14.1 |
| 4,010,714 | 3/1977 | Notsuki et al. | 119/14.03 |

FOREIGN PATENT DOCUMENTS 49-138075 11/1974 Japan.
49-138076 11/1974 Japan.
49-138077 11/1974 Japan.

*Primary Examiner*—Hugh R. Chamblee
*Attorney, Agent, or Firm*—Cushman, Darby & Cushman

[57] ABSTRACT

A milking method susceptible of automation employs a teat cup with a support surface projecting to one side of the top of the cup. The cup is moved laterally against a teat until this lays on the support surface, after which movement is reversed while suction is applied to the cup, so that the teat falls and is sucked into the cup. A machine for carrying out the method can be controlled in response to signals from an electronic camera, touch or proximity sensors on the teat cup, and a vacuum sensor signalling entry of a teat into the cup.

13 Claims, 6 Drawing Figures

MILKING METHOD AND APPARATUS

FIELD OF THE INVENTION

This invention relates to the milking of cows.

Milking is a task which has become increasingly automated in particular with the aim of reducing to a minimum the number of dairymen required and/or to increase the number of cows which can pass through a milking parlour in a given time without increasing the number of dairymen required. To place the teat cups of a milking machine onto the teats of a cow's udder automatically has been recognised as a desideratum for many years. However, no solution to this problem has reached commercial production, and the placing of teat cups is still done by hand.

The automatic placing of teat cups is made difficult by the properties of a cow's teats. These are very flexible and pliable and can, moreover, be inadvertently twisted or "wound-up" which is undesirable. Teats, further, can suffer damage with possible risk of mastitis and must therefore be handled carefully. A dairyman when fitting teat cups to the teats of a cow normally holds the teat cup with some only of the fingers of one hand and guides the teat into the cup with other fingers of the same hand. This method entails complex movements requiring the considerable dexterity of the human hand to carry them out.

SUMMARY OF THE INVENTION

It is an object of the present invention to provide a method of placing a teat cup on a cow's teat which requires less complex movement and which, although capable of being carried out by hand, is susceptible of being carried out by automatic machinery. If it is carried out by hand, less dexterity is required than for the present manual method. The invention also seeks to provide a teat cup suitable for use in the method of the invention and machinery by which the method may be carried out. According to a first aspect of this invention there is provided a method of placing a teat cup on a cow's teat, the teat cup having a hollow element with an opening into its interior at the top of the cup, and a milk outlet from the interior by which suction may be applied to the interior, characterised in that the cup has a teat supporting surface extending from the said opening to at least one side thereof, and characterised by the steps of moving the cup in an upright position against the teat, the direction of movement including at least a lateral component, and the supporting surface being in a trailing position relative to the lateral component, the movement lifting the lowered parts of the teat and being continued until the teat lays on the supporting surface with its tip over, or to the trailing side of the said opening, and then moving the cup in the opposite lateral direction while applying suction to the cup interior, so that the teat is progressively drawn down through the said opening into the cup.

In a second aspect the invention provides a teat cup comprising a hollow element with an opening into its interior at the top of the cup, and a milk outlet from its interior by which suction may be applied to the interior, characterised in that the cup has a teat supporting surface extending from the said opening at one side only thereof, the surface extending substantially further from the opening in a lateral direction than in the reverse lateral direction or to either side of that direction.

In a third aspect of the invention there is provided, in combination, a teat cup and machinery for placing the teat cup on a cow's teat by the method specified above, the teat cup comprising a hollow element with an opening into its interior at the top of the cup, and a milk outlet from its interior by which suction may be applied to the interior, and the machinery comprising a support member moveable beneath the cow and including a head portion with means for holding the teat cup in an upright position characterised in that the teat cup has a teat supporting surface extending from the said opening to at least one side thereof, and in that the machinery includes powered means to move at least the head portion of the support member laterally, and control means connected to the powered means and arranged to cause it to move the head portion in a direction including at least a lateral component to bring the cup in an upright position against the teat, until the teat lays on the supporting surface with its tip over, or on the trailing side of, the said opening, and then to move the head portion in the opposite lateral direction while suction is applied to the cup interior so that the teat is progressively drawn down through the said opening into the cup.

This invention also provides, in a yet further aspect, an automatic machine for placing a teat cup on a teat of a cow in a stall in a milking parlour, comprising a support member moveable beneath the cow, the support means including a head portion with means for releaseably holding a teat cup, powered means for moving the support means to position the head portion beneath the udder of the cow, sensing means, preferably in the form of an electronic camera, for detecting the position of a teat, and control means connected to the powered means and to the sensing means and arranged so as to cause the support means to move, in response to signals from the sensing means, to position the teat cup proximate the teat and thereafter to move to introduce the teat into the teat cup.

BRIEF DESCRIPTION OF THE DRAWINGS

FIG. 4 is a diagrammatic plan view of a machine for automatically placing teat cups;

FIG. 5 is a side view of the head portion of the machine; and

FIG. 6 is a diagram illustrating connections between various parts.

DESCRIPTION OF PREFERRED EMBODIMENTS

Figure 1:
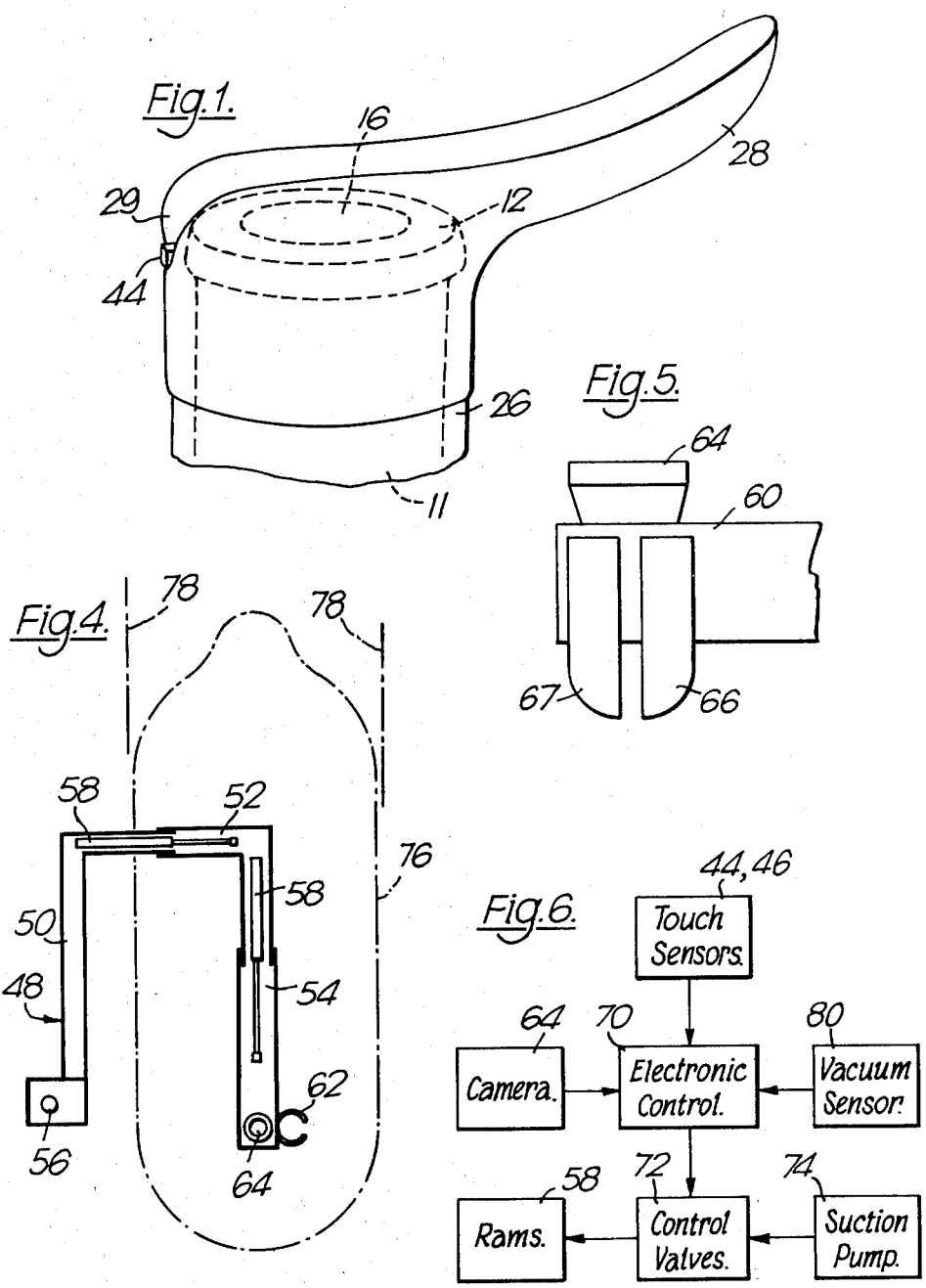
FIG. 1 is a perspective view of an embodiment of a teat cup suitable for use in the method of this invention.
Figure 2:
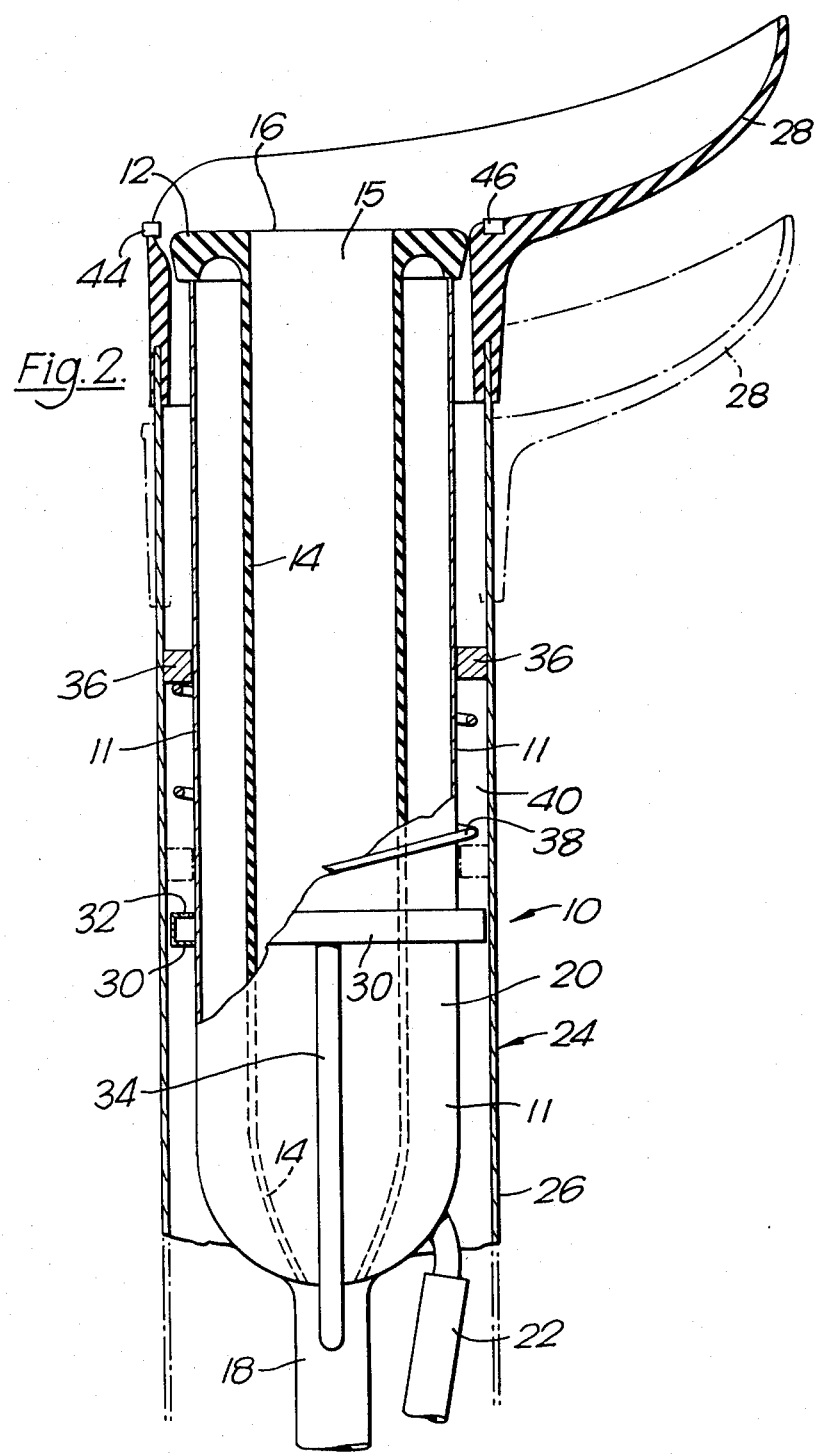
FIG. 2 is a side view of the teat cup of FIG. 1 much of the cup and the whole of the surrounding sleeve and support surface being in section.

Referring first to FIGS. 1 and 2, the teat cup 10 shown has, as is conventional, a rigid stainless steel body 11 within which there is contained a rubber insert which has a top part 12 and a flexible tube 14 which defines the cup interior 15. The tube 14 extends from a teat receiving opening 16 at the top of the cup and extends down to a suction tube 18. Between the tube 14 and the rigid body 11 there is defined a closed chamber 20 connected to a pulsation tube 22 in a conventional manner. Because the opening 16 is defined by an elastic material it can be distorted or stretched, but apart from this its size is fixed.

The teat cup is surrounded by a retractable sleeve 24 consisting of a rigid stainless steel tube 26 connected to a rubber upper part 28 which, as best seen from FIG. 1 provides a support surface extending from one side of the top 12 of the teat cup. This surface extends from approximately the level of the top 12 of the teat cup, and extends slightly upwardly as shown.

The body 11 of the teat cup is surrounded by a ring duct 30 provided with a number of apertures 32 distributed around its upper surface. The ring duct is connected by a tube 34 to the suction tube 18. The steel part of the sleeve 26 carries a ring 36 and a weak spring 38 acting between the ring duct 30 and the ring 36 urges the sleeve 24 to the position shown in full lines in FIG. 2. Suction on the tube 18 will tend to draw air out of the interior 15 of the teat cup as well as out of the space 40 defined between the ring duct 30 and the ring 36. As long as the opening 16 is clear the suction will be insufficient to overcome the spring 38 and so the support surface provided by the rubber part 28 will remain at the level of the top of the teat cup. However, when a cow's teat enters through the opening 16 (in a manner to be described hereinafter) to a sufficient extent to close it off, a vacuum will be developed in the interior 15 of the teat cup, in the suction tube 18 and consequently in the space 40 with the result that the sleeve 24 and the teat cup body 11 will slide relatively to each other until the sleeve 24 is in the position illustrated in phantom in FIG. 2.

Figure 3:
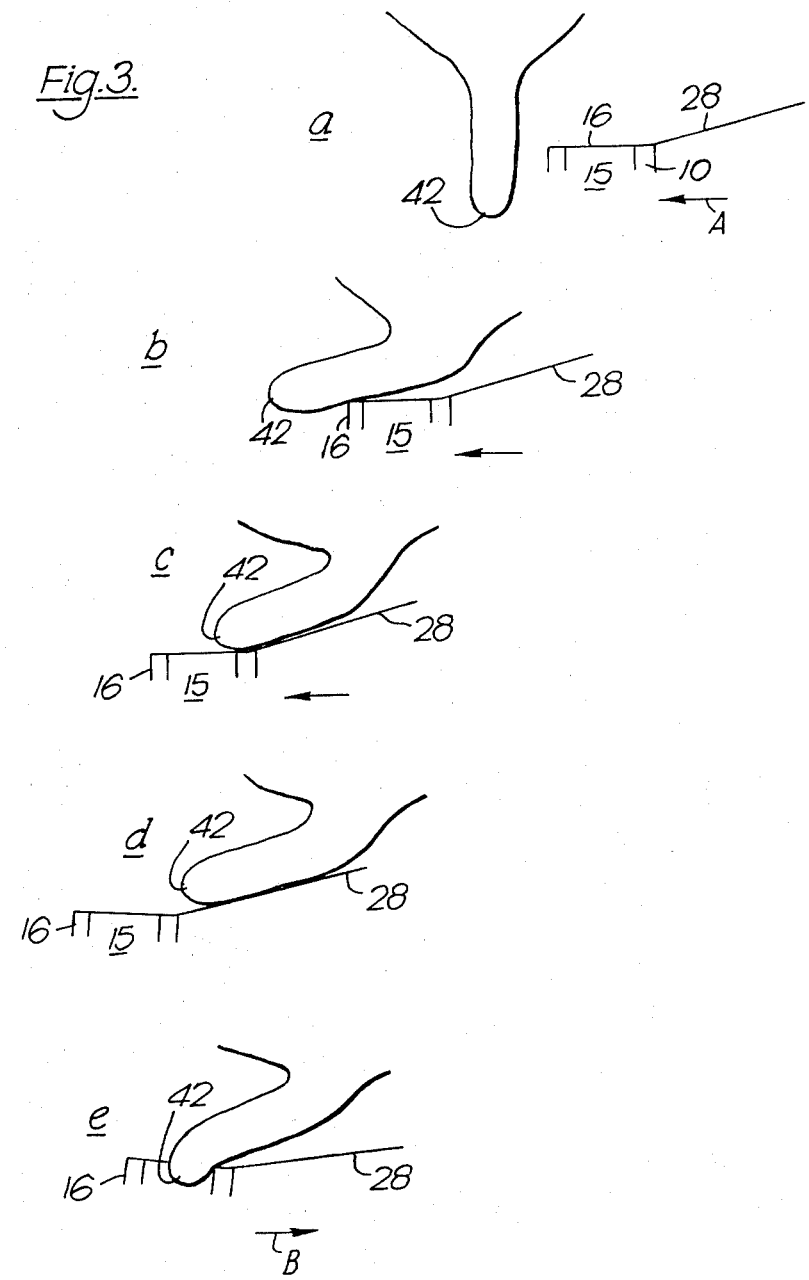
FIGS. 3a to 3e diagrammatically illustrate the insertion of a teat into a teat cup by the method of this invention.

FIG. 3 illustrates an Example of the method by which the teat is introduced into a teat cup. As shown in FIG. 3a a teat cup 10 is brought into position proximate a teat above the tip 42 of the teat but below the cow's udder. The teat cup is then moved laterally, as shown by the arrow A, pushing the teat to one side and causing it to lay back against the udder as shown in FIGS. 3b and 3c. During this movement the test cup is held generally upright with the support surface in the trailing position relative to the direction of movement. The movement is continued until the opening 16 at the top of the teat cup has passed the tip 42 of the teat and the teat is lying on the support surface 28 with its tip 42 proximate the opening 16 at the trailing side thereof as shown in FIG. 3d. It will be appreciated that the lower parts of the teat have been lifted by this process. Movement is now stopped and a movement in the opposite lateral direction, as indicated by the arrow B, is commenced while at the same time suction is supplied to the interior 15 of the teat cup so as to suck air in through the opening 16 at its top. During this reverse movement the teat is tending to fall into the teat cup and at the same time the suction applied to the teat cup sucks the teat down into it. As the teat cup comes to a position directly beneath the teat the suction will tend to lift the teat cup and so complete the entry of the teat into the teat cup. When the teat is properly inserted into the teat cup it will close the opening 15 which as explained above will cause the support surface 28 to be pulled down relative to the top of the teat cup.

As shown in FIG. 1 the support surface 28 has an open mouth 29 but alternatively a lip could be provided at this point over which the teat could ride during movement of the teat cup in the direction indicated by the arrow A.

Suction may be applied to the interior 15 of the teat cup during the initial movement illustrated by FIGS. 3a-3c, but this would not be essential. As described above the movements are purely lateral but the first movement could have an upward component as well as the lateral movement indicated by the arrow A and indeed there could also be some upward component during the opposite movement indicated by the arrow B. If the first movement does include an upward component it may be unnecessary for the teat cup initially to contact the teat part way between the tip 42 and the udder. Instead the initial contact might be between the tip 42 of the teat and either the upper surface 12 of the teat cup or the support surface 28, but the movement must lead to a position as shown in FIG. 3d in which the teat has been lifted and lays on the support surface 28.

During the movements of the teat cup described above it need not be held absolutely vertical, and indeed during the movement in the direction indicated by the arrow B (FIG. 3e) it may be desirable for the teat cup to be tilted slightly towards the teat as illustrated.

It will be appreciated that the movements of the teat cup described with reference to FIG. 3 are relatively simple. This method of fitting a teat cup to a teat can be carried out by hand but because of the simplicity of the movements involved it is susceptible of being carried out by an automatic machine. If this is done a touch or proximity sensor may be provided at the position 44, and to assist in determining when the position shown in FIG. 3d has been reached a touch sensor could be provided at the position 46 in FIG. 2.

In FIG. 4 of the drawings there is shown very diagrammatically a machine for carrying a teat cup under a cow and thereafter automatically placing the cup on a teat. The machine has a generally U-shaped support beam 48 formed by three arms 50, 52, 54, and which is carried on a pivot 56. Means, not shown, are provided for turning the pivot and for raising and lowering the support beam. The arms 52 and 54 are telescopic and can be extended and retracted by means of vacuum rams 58. The arm 58 terminates in a head portion 60 to which there is fitted a holder 62 for a teat cup and a upwardly facing electronic camera 64. The holder 52 is formed by two parts 66, 67 defining a generally cup shaped aperture in which a teat cup can be carried.

As diagrammatically shown by FIG. 6 the camera 64, and any sensing means 44, 46 are connected to electronic control means 70 which are connected to govern the operation of valves 72 which connect a vacuum pump 74 (which may well be the main suction pump of the milking machinery) to the rams 58. The electronic control means 70 are also connected, directly or indirectly, to the means for rotating the support beam 48 around the pivot 56 and for raising and lowering it.

In use the machine picks up a teat cup from a fixed point and swings round to take its head portion 60 and hence the teat cup, in beneath the belly of the cow and rearwardly to generally under its udder. A cow and its stall are indicated diagrammatically as 76 and 78. The camera 64, in conjunction with the control means is then used to determine the position of a teat after which the control means causes the machine to move until the teat cup is at a starting position proximate a teat, for example as shown in FIG. 3a.

The camera and control means can be programmed to scan over an area and, by the known technique of character recognition detect a shape of certain dimensions, namely a teat. The camera may be colour sensitive, using its colour sensitivity to detect a difference in colour between the teats and the remainder of the udder. This can be assisted by a deliberate application of fairly permanent colouring to either the teats or udders of the cows to be milked.

Arrival at the starting position proximate a teat may be determined by the camera 64 or by a proximity or touch sensor 44. When these preliminary movements have been completed the control means causes the machine to move so that the head portion 60 executes a lateral movement (possibly also with an upward vertical component) to bring the teat cup against the teat so lifting it until it lays on the support surface 28 as shown in FIG. 3d. This movement may be controlled in response to signals from sensors 44 and 46 or may simply be effected by moving a predetermined lateral distance from the starting position such as that shown in FIG. 3a, reached at the end of the preliminary movements. The control means than causes the head portion of the machine to be moved in the opposite lateral direction and during this time at least, suction is applied to the teat cup so that the teat is introduced into the teat cup.

A vacuum sensor 80 connected to the suction line 18 is also connected to the control means. When the teat cup is on the teat, a vacuum develops in the suction line 18 and this is signalled to the control means 70 which thereupon causes lateral movement to be stopped and the support beam 48 to be lowered so disengaging it from the teat cup which is now on the teat.

I claim:

1. A method of placing a teat cup on a cow's teat, the teat cup having a hollow element with an opening into its interior at the top of the cup, and a milk outlet from the interior by which suction may be applied to the interior, characterised in that the cup has a teat supporting surface extending from the said opening to at least one side thereof, and characterised by the steps of moving the cup in an upright position against the teat, the direction of movement including at least a lateral component, and the supporting surface being in a trailing position relative to the lateral component, the movement lifting the lower parts of the teat, and being continued until the teat lays on the supporting surface with its tip over, or to the trailing side of, the said opening, and then moving the cup in the opposite lateral direction while applying suction to the cup interior, so that the teat is progressively drawn down through the said opening into the cup.

2. A method according to claim 1 characterised in that during the movement in the said opposite direction the cup is held slightly tilted towards the teat.

3. A method according to claim 1 or claim 2 including the further step of relatively moving the hollow element and the supporting surface after entry of the teat into the cup, so as to lower the supporting surface relative to top of the cup.

4. In combination, a teat cup and machinery for placing the teat cup on a cow's teat, the teat cup comprising a hollow element with an opening into its interior at the top of the cup, and a milk outlet from its interior by which suction may be applied to the interior, and the machinery comprising a support member moveable beneath the cow and including a head portion with means for holding the teat cup in an upright position characterised in that the teat cup has a teat supporting surface extending from the said opening to at least one side thereof, and in that the machinery includes powered means to move at least the head portion of the support member laterally, and control means connected to the powered means and arranged to cause it to move the head portion in a direction including at least a lateral component to bring the cup in an upright position against the teat until the teat lays on the supporting surface with its tip over, or to the trailing side of the said opening and then to move the head portion in the opposite lateral direction while suction is applied to the cup interior so that the teat is progressively drawn down through the said opening into the cup.

5. The combination of claim 4 further including sensing means for detecting the position of a teat, the control means being connected to the sensing means and being arranged to control said movement of the head portion in response to signals from the sensing means.

6. The combination of claim 5 characterised in that said sensing means comprises a touch sensor or proximity sensor.

7. The combination of claim 4, claim 5 or claim 6 having connected to the control means powered means to move at least the head portion of the support member to a position wherein the teat cup held thereby is proximate a teat, the control means being arranged to cause a preliminary movement to that position prior to the movements specified in claim 4.

8. The combination of claim 7 characterised in that said sensing means comprises a camera, said control means being arranged to cause said preliminary movement in response to signals from said camera.

9. A teat cup comprising a hollow element with an opening into its interior at the top of the cup, and a milk outlet from its interior by which suction may be applied to the interior, characterised in that the cup has support means defining a teat supporting surface extending in a lateral direction from the said opening, said surface extending substantially further from the opening in said lateral direction than in the reverse lateral direction or to either side of the said direction and means for retracting said support means below said opening after entry of a teat into said cup and maintaining said support means retracted during milking.

10. A teat cup comprising a hollow element with an opening into its interior at the top of the cup, and a milk outlet from its interior by which suction may be applied to the interior, characterised in that the cup has means defining a teat supporting surface extending laterally from the said opening, a sleeve surrounding said hollow element and which carries the support surface, and means for retracting said sleeve to below the opening of the cup after the entry of a teat into the cup and maintaining said sleeve retracted below said opening during milking.

11. A teat cup according to claim 10, wherein said sleeve is a retractable sleeve resiliently urged to a position with the support surface at the level of the said opening into the cup, and said means for retracting said sleeve are vacuum operable means connected to the cup interior so that suction applied to the cup interior will retract the sleeve after said opening has been closed by the entry of a teat into the cup.

12. A teat cup according to claim 11 characterised in that the hollow element has an external projection, and the sleeve has an internal projection, which projections encircle the hollow element and substantially close off a section of the cavity between the hollow element and the sleeve, the said cavity section being connected to the cup interior.

13. A teat cup according to claim 12 characterised in that the external projection on the hollow element is a duct encircling the hollow element, which duct has apertures opening into the cavity section, and is connected to the cup interior.

* * * * *